(12) United States Patent
Bonnaud et al.

(10) Patent No.: US 8,336,813 B2
(45) Date of Patent: Dec. 25, 2012

(54) ENGINE PYLON FOR THE SUSPENSION OF A TURBO ENGINE UNDER AN AIRCRAFT WING

(75) Inventors: Cyril Bonnaud, Toulouse (FR); Thierry Fol, Grenade (FR); Anne Dumoulin, Toulouse (FR); Tom Gibson, Berkeley (GB); Neil Lyons, Bristol (GB)

(73) Assignees: Airbus Operations SAS, Toulouse (FR); Airbus UK Limited, Filton, Bristol (GB)

( * ) Notice: Subject to any disclaimer, the term of this patent is extended or adjusted under 35 U.S.C. 154(b) by 492 days.

(21) Appl. No.: 12/550,454

(22) Filed: Aug. 31, 2009

(65) Prior Publication Data

US 2010/0051744 A1   Mar. 4, 2010

(30) Foreign Application Priority Data

Sep. 3, 2008  (FR) ...................... 08 04831

(51) Int. Cl.
*B64D 27/00*   (2006.01)
(52) U.S. Cl. ............... 244/54; 244/53 R; 244/55
(58) Field of Classification Search ............ 244/54, 244/53 R, 55
See application file for complete search history.

(56) References Cited

U.S. PATENT DOCUMENTS

| 2,995,320 | A | * | 8/1961 | Gottschalk | 244/15 |
| 4,449,683 | A | * | 5/1984 | Gratzer et al. | 244/130 |
| 4,540,143 | A | * | 9/1985 | Wang et al. | 244/130 |
| 4,637,573 | A | * | 1/1987 | Perin et al. | 244/54 |
| 7,721,999 | B2 | * | 5/2010 | Voogt | 244/213 |
| 2005/0274846 | A1 | * | 12/2005 | Dun | 244/55 |
| 2007/0284477 | A1 | * | 12/2007 | Guering | 244/54 |
| 2008/0067292 | A1 | * | 3/2008 | Bonnaud et al. | 244/199.1 |
| 2009/0032639 | A1 | * | 2/2009 | Dantin et al. | 244/37 |
| 2011/0248116 | A1 | * | 10/2011 | Diochon et al. | 244/54 |

FOREIGN PATENT DOCUMENTS

| FR | 2 899 201 | 10/2007 |
| GB | 2 200 878 | 8/1988 |
| WO | 95/17334 | 6/1995 |

OTHER PUBLICATIONS

Preliminary Search Report dated Apr. 8, 2009 w/ English translation.

* cited by examiner

*Primary Examiner* — Isam Alsomiri
*Assistant Examiner* — Justin Benedik
(74) *Attorney, Agent, or Firm* — Dickinson Wright PLLC

(57) ABSTRACT

According to the invention, the engine pylon for the suspension of a turbo engine under an aircraft wing is such that the trailing edge of the rear lower part of the engine pylon is shifted toward the root of the wing.

7 Claims, 6 Drawing Sheets

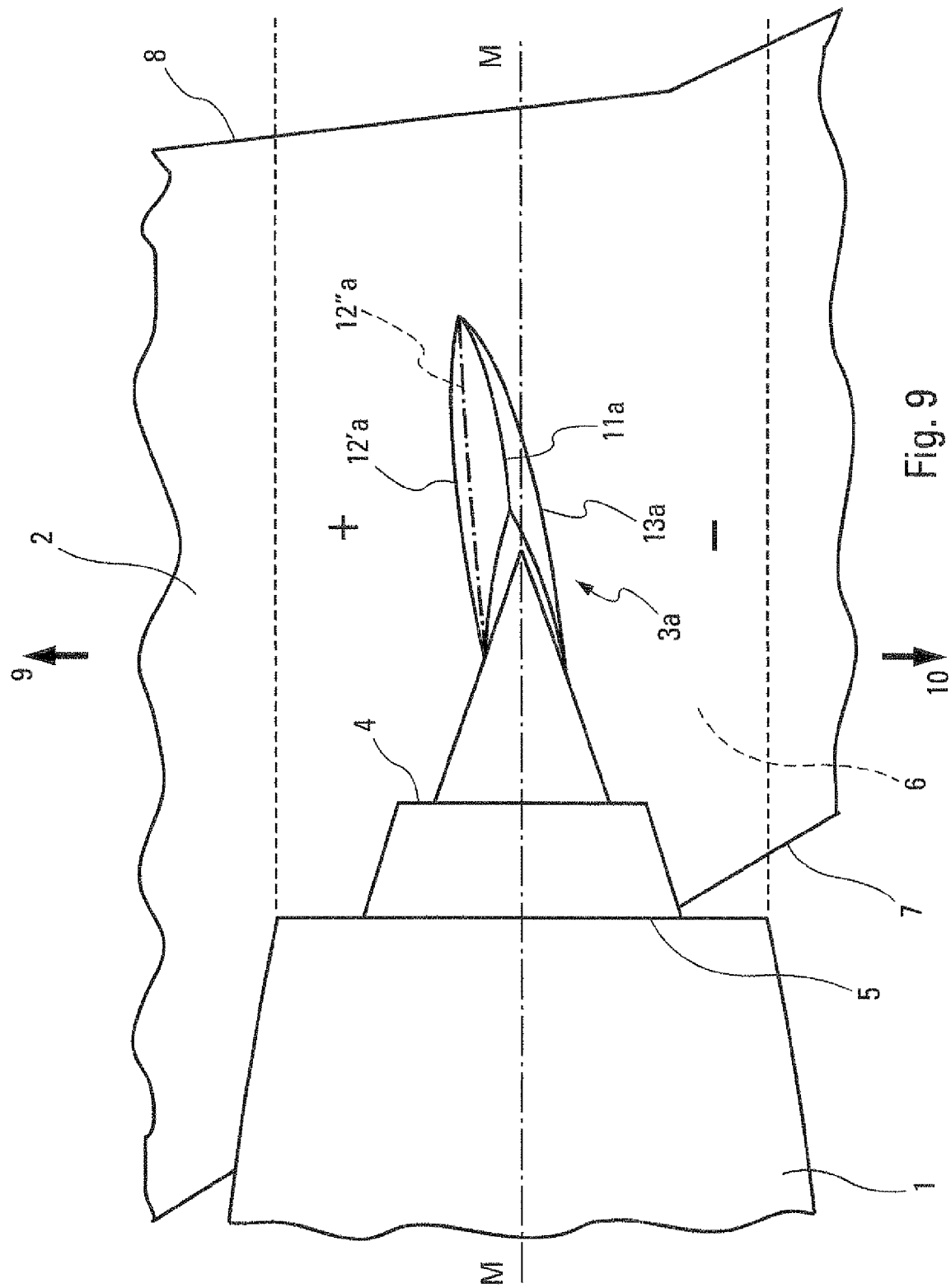

US 8,336,813 B2

ENGINE PYLON FOR THE SUSPENSION OF A TURBO ENGINE UNDER AN AIRCRAFT WING

The present invention relates to a engine pylon for suspending a turbo engine from the wing of an aircraft.

It is known that aircraft wing engines are suspended from the wings of this aircraft by suspension engine pylons that act as an interface connecting the wings and the engines.

It is also known that the presence of such a suspension engine pylon and of the engine it carries greatly disturbs the aerodynamic stream, particularly over the intrados of said wing. This therefore results in a significant local perturbation to the lift near the engine pylon, this lift suffering a sharp drop on the root side of the wing and an increase on the distal end side thereof.

In addition, this perturbation to the aerodynamic stream forms vortex layers which are shed by the trailing edge of the wing, giving rise to an important induced drag.

It is an object of the present invention to overcome these disadvantages.

To this end, according to the invention, the engine pylon for suspending a turbo engine from the wing of an aircraft, said turbo engine having a vertical mid-plane passing through its longitudinal axis and said engine pylon comprising two lateral faces, of which one is directed toward the root of said wing and the other toward the distal end thereof, said lateral faces converging to form a trailing edge at the rear of said engine pylon, and the lower part of said rear of the engine pylon supporting the hot stream nozzle of said turbo engine such that said lower part of the rear of the engine pylon is swept by the cold stream of this turbo engine, is noteworthy in that at least said lower part of the rear of the engine pylon is curved toward the root of said wing so that at least the trailing edge of said lower part is shifted toward said root with respect to said vertical mid-plane.

Thus it is possible to deflect the aerodynamic stream of the cold stream from the turbo engine sweeping at least over the lower part of the rear of the engine pylon. This deflection generates, on the one hand, an increase in pressure on the side of the lateral face directed toward the root, making it possible to increase the local lift and thus compensate for the sharp drop in lift caused by the presence of the engine pylon and, on the other hand, a reduced pressure of the side of the lateral face directed toward the distal end, making it possible appreciably to reduce the local lift and therefore compensate for the increase in lift caused by the presence of the engine pylon.

Furthermore, modifying the local pressures on the intrados in the vicinity of the two lateral faces of the engine pylon leads to a transverse shift in the cold stream of the turbo engine. This stream moves away from the intrados on the side of the lateral face directed toward the root, but moves closer to the intrados on the side of the lateral face directed toward the distal end. Such a transverse shift in the cold stream of the turbostream engine accentuates the local overpressure and depression generated by the curvature of the engine pylon, thus further correcting the lift in the vicinity of the lateral faces of the engine pylon.

In addition, such lift compensation reduces the induced drag of the wing, making it possible to increase the payload of the aircraft by several tens of kilos to several hundred kilos (depending on the nature of the aircraft) for the same fuel consumption.

For preference, all of the rear of the engine pylon is curved toward said root so that all of said trailing edge of said engine pylon is shifted toward said root.

Thus, the aerodynamic stream contained between the intrados and the engine casing at the lateral faces of the engine pylon is also deflected, thus further compensating for local lift near the engine pylon.

The rear of the engine pylon may be entirely fixed. However, as an alternative, at least said lower part of the rear of said engine pylon consists of a mobile trailing edge flap such that it can reversibly occupy at least one of the following two positions:

an shifted position in which said trailing edge of said lower part is shifted at least partially toward said root; and an aligned position in which said mobile flap is aligned with the fixed part of said engine pylon.

Thus, the inclination of the flap may be variable and depend on the aircraft flight and loading conditions.

For preference, at least in the region of the lower part of the rear of the engine pylon, said lateral face directed toward said root is concave. However, the latter lateral face may be at least substantially planar, or even convex.

If the two lateral faces of the engine pylon are convex, the convex nature of said lateral face directed toward said distal end is more pronounced than the convex nature of said lateral face directed toward said root.

The figures of the attached drawing will make it easy to understand how the invention may be embodied. In these figures, identical references denote elements that are similar.

FIG. 9 is an enlarged view similar to FIG. 6, depicting two alternative forms of embodiment of the suspension engine pylon according to the present invention.

Figure 1:
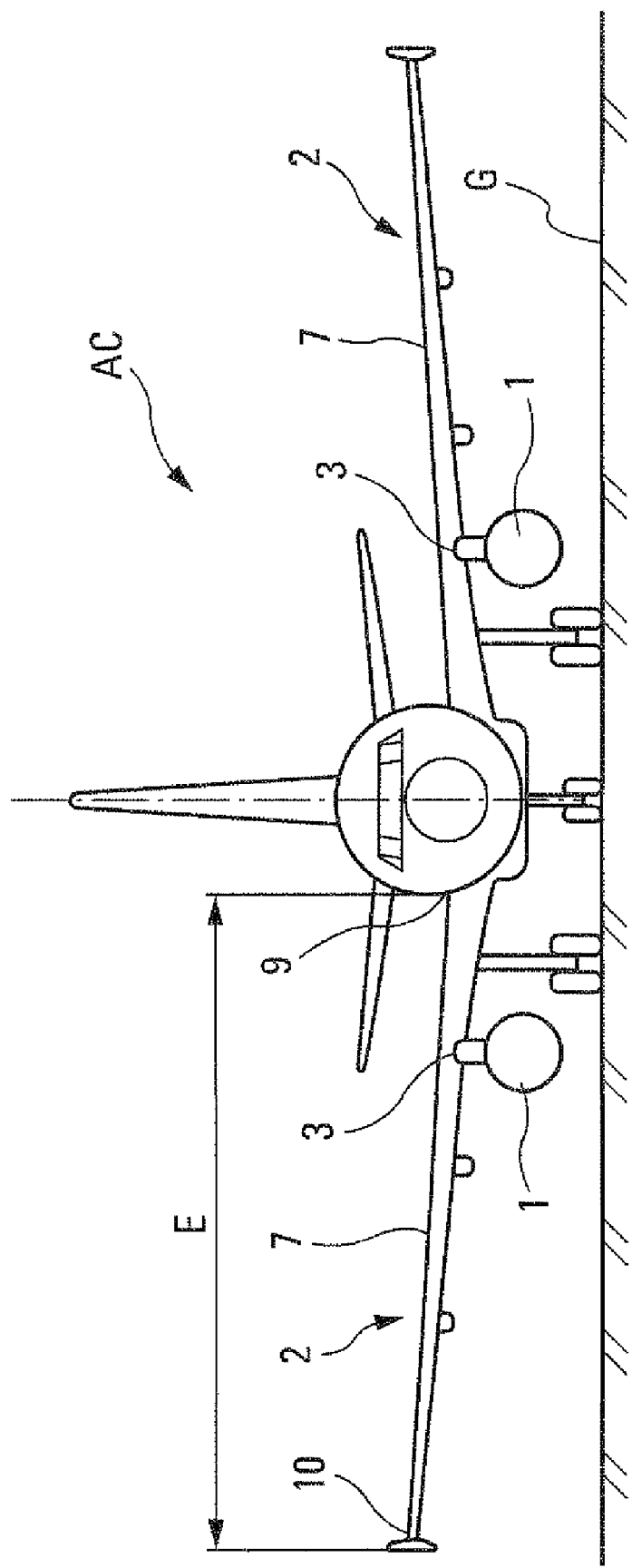
FIG. 1 is a front view of an aircraft with two wing-mounted engines.

The aircraft AC, shown in FIG. 1, is a twin-engined airplane comprising two turbo engines 1, each suspended from a respective wing 2 of said aircraft AC, via a suspension engine pylon 3.

In the usual way, as shown by FIGS. 1 to 4:

each engine 1 has a vertical mid-plane M-M passing through its longitudinal axis L-L and comprises a hot stream nozzle 4 and a cold stream nozzle 5, said cold stream 6 enveloping said hot stream (not depicted);

each wing 2 comprises a leading edge 7 and a trailing edge 8 and extends, with a span E, between its root 9 and its distal end 10; and each suspension engine pylon 3 is profiled so that it comprises, at its rear 14, a trailing edge 11 positioned in the vertical mid-plane M-M and delimited by two convergent lateral faces 12 and 13 respectively directed toward said root 9 and toward said distal end 10. The lower part 14I of the rear 14 supports the hot stream nozzle 4 and, as a result, penetrates the upper part of said cold stream 6 by which it is swept.

Figure 5:
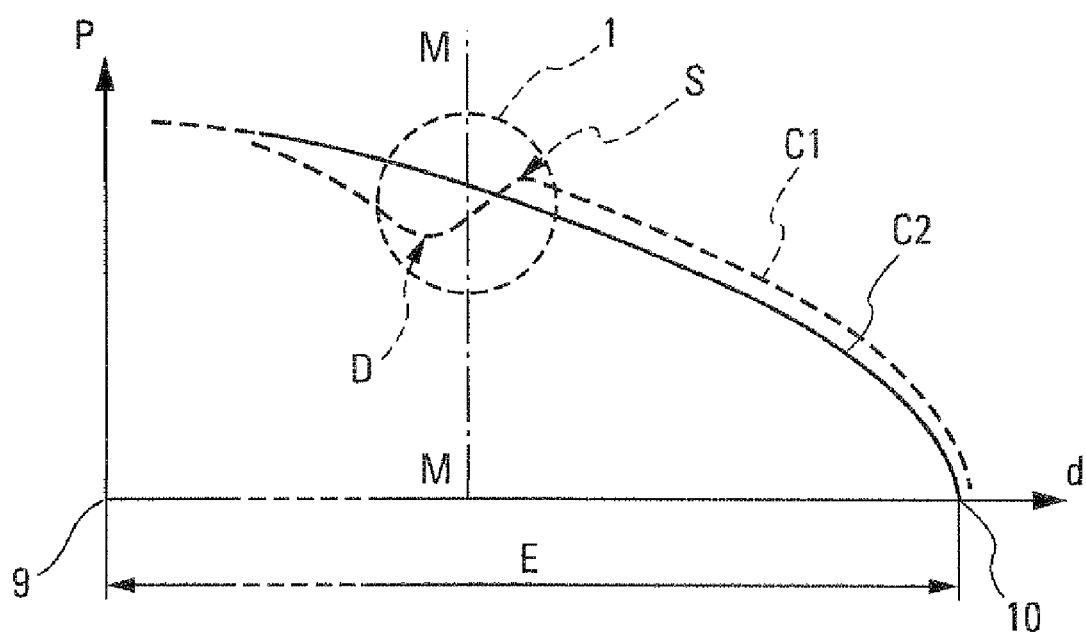
FIG. 5 is a diagram illustrating the variation in lift P as a function of the span E of the wing of FIGS. 1 to 3.

As shown by the curve C1 in dotted line in FIG. 5, there is a sharp variation in the lift in the vicinity of the engine pylon 3. Indeed, the local lift on the side of the lateral face 12 directed toward the root 9 drops (curved part D in FIG. 5) significantly, whereas the local lift on the side of the lateral face 13 directed toward the distal end 10 increases substantially (curved part S in FIG. 5).

Figure 2:
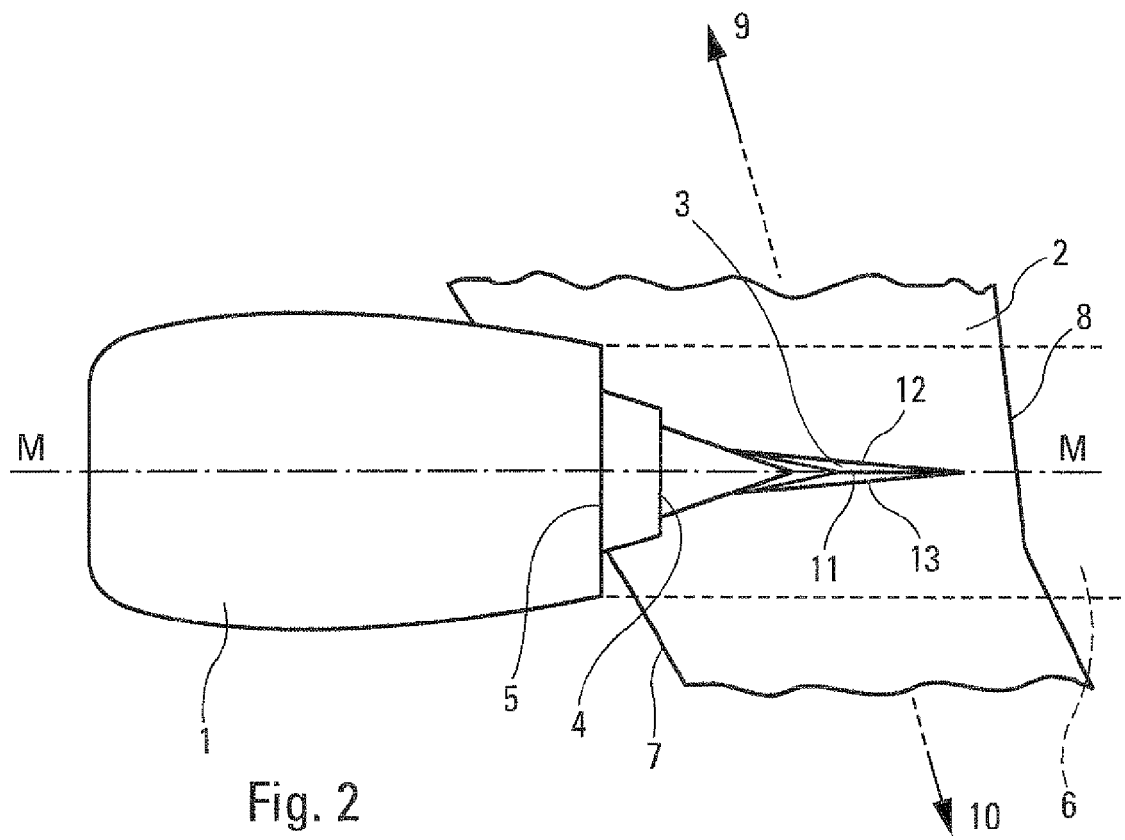
FIG. 2 is schematic view from beneath, in the direction of arrow 11 of FIG. 3, of a portion of a wing of the aircraft of FIG. 1, from which a turbo engine is suspended by a suspension engine pylon.
Figure 3:
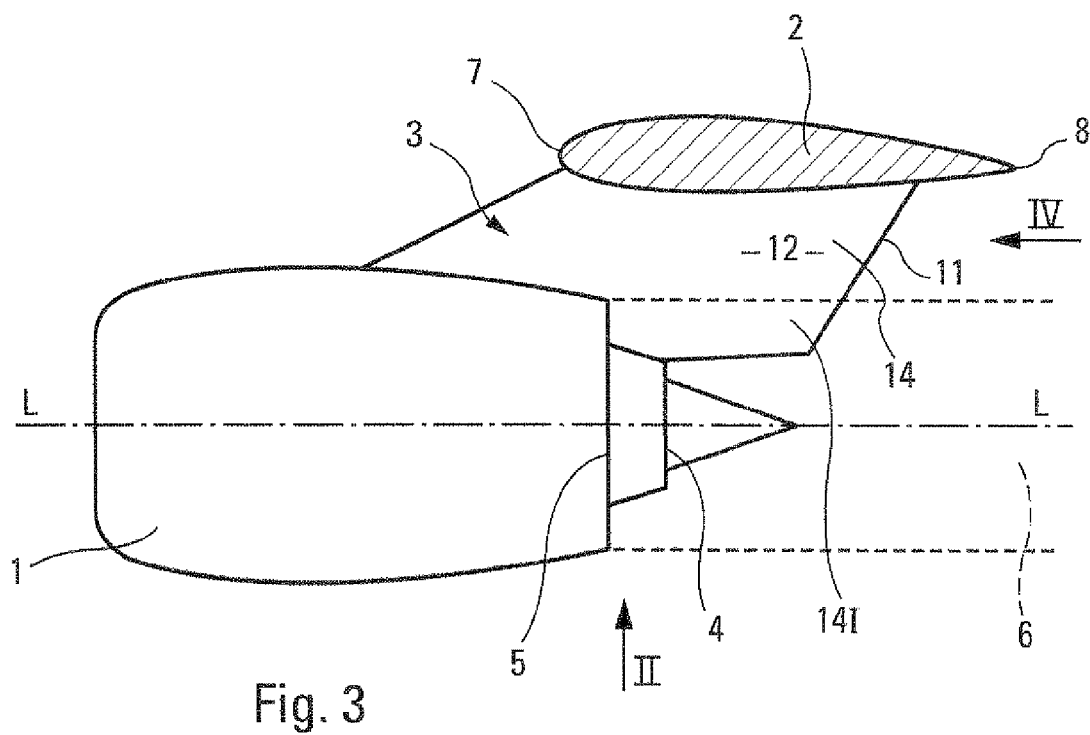
FIG. 3 is a schematic sectional view of a wing of the aircraft of FIG. 1, at the site of a turbo engine and of its suspension engine pylon.
Figure 4:
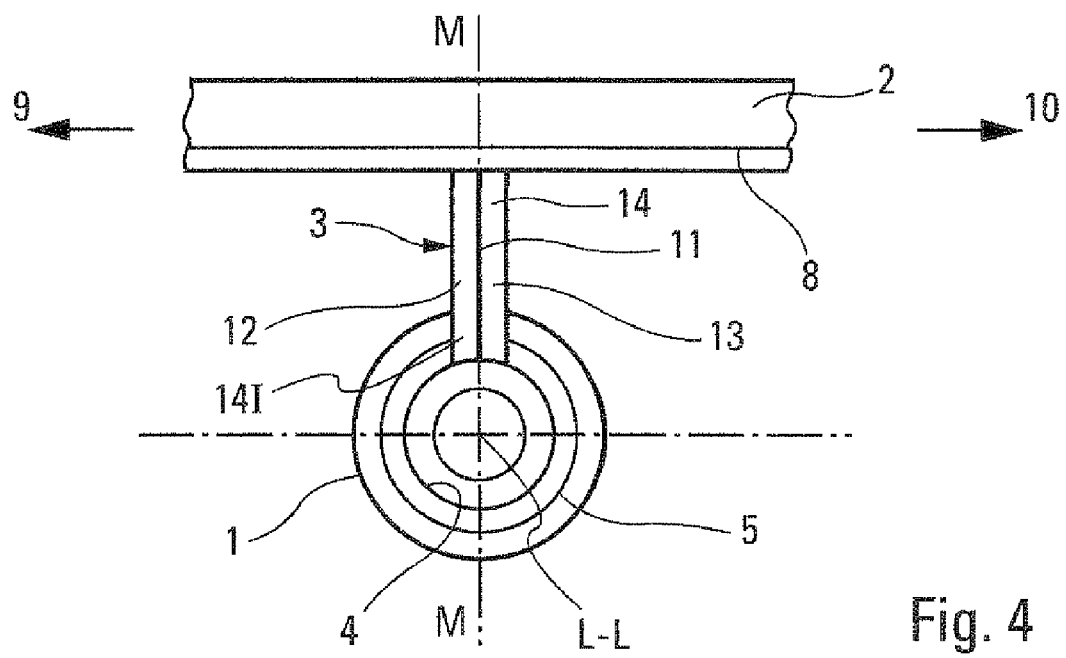
FIG. 4 is a view from the rear of a wing of the aircraft of FIG. 1, in the direction of arrow IV of FIG. 3, of said wing portion, of the turbo engine and of the suspension engine pylon.
Figure 6:
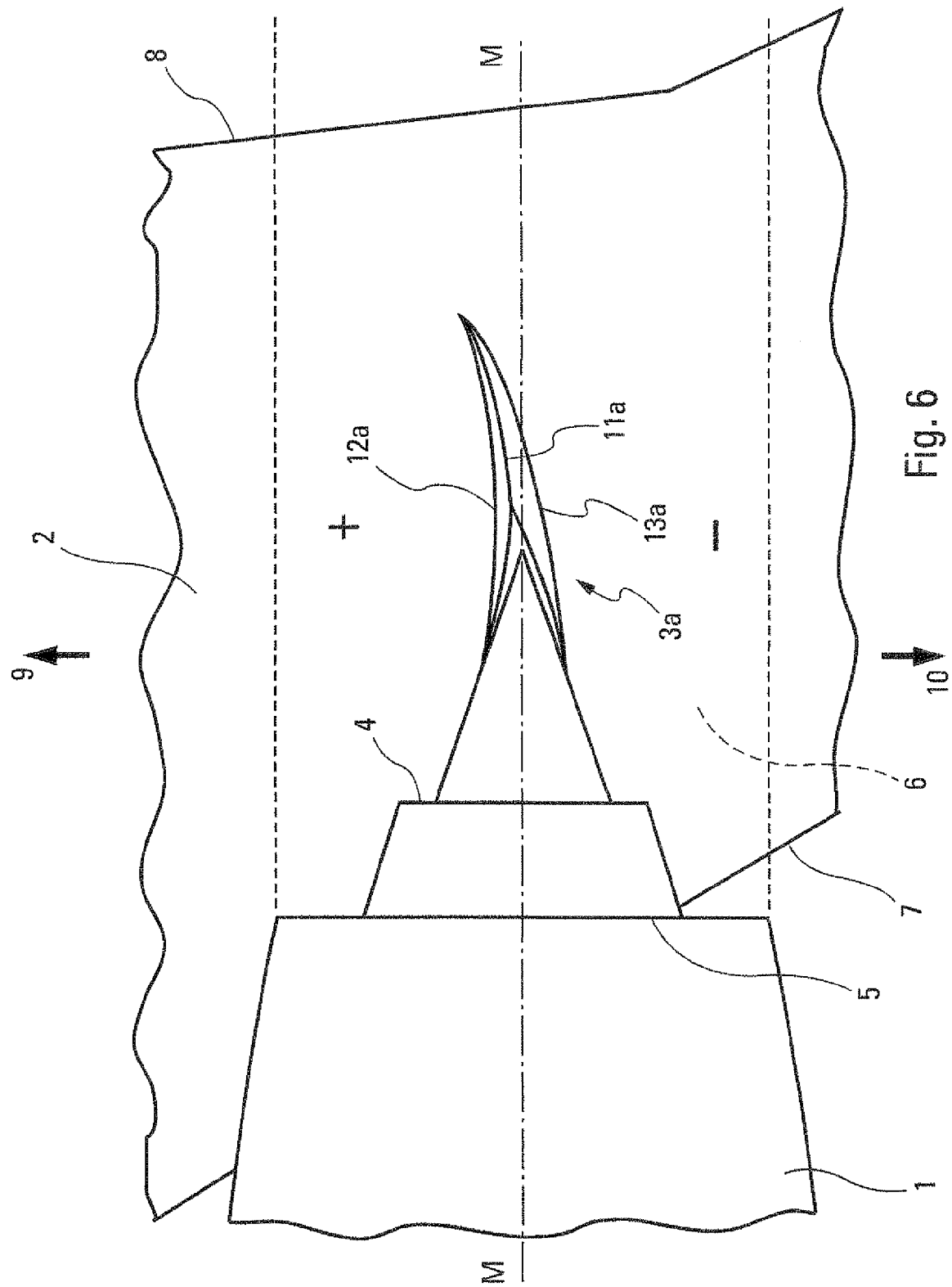
FIG. 6 illustrates, in an enlarged view similar to FIG. 2, the suspension engine pylon according to the present invention.
Figure 7:
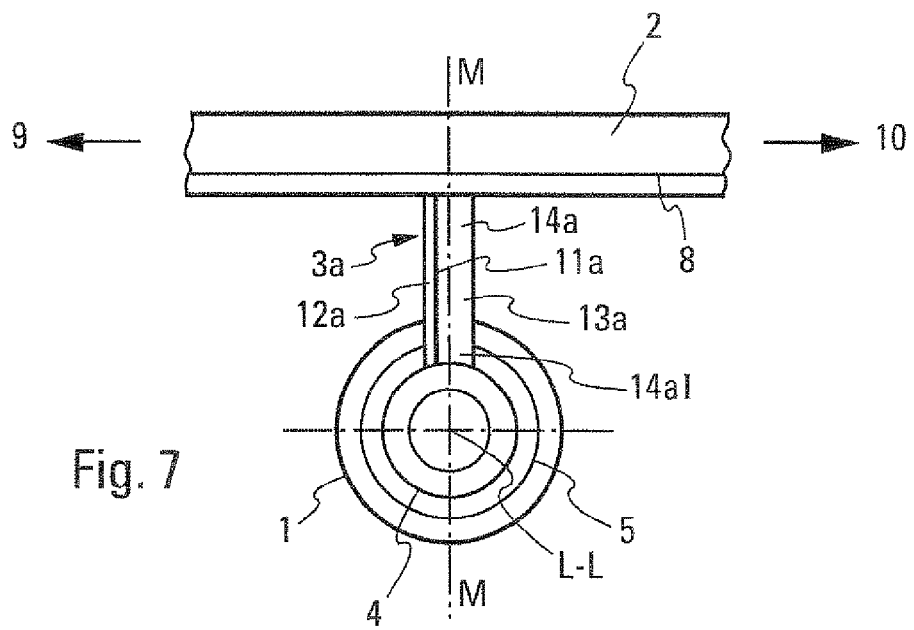
FIG. 7 shows, in a view from the rear similar to FIG. 3, the suspension engine pylon of FIG. 6.
Figure 8:
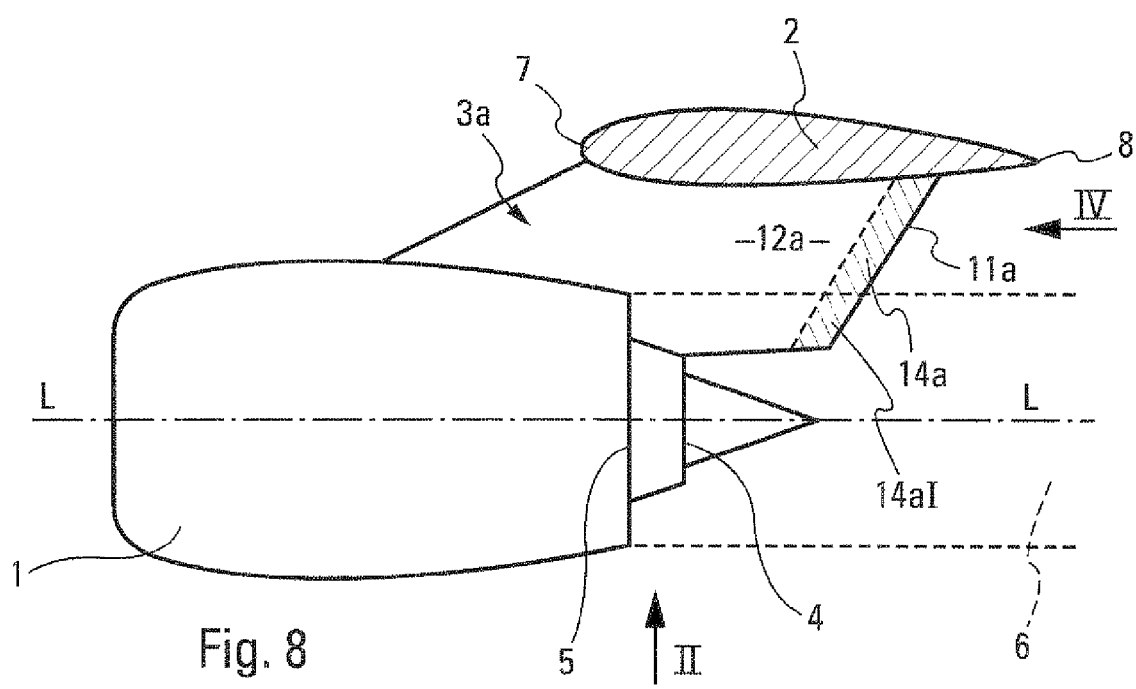
FIG. 8 shows, in a schematic sectional view similar to FIG. 3, the suspension engine pylon according to the invention.

In the embodiment of the invention that is shown by FIGS. 6 to 8 (in which the elements that correspond to the engine pylon 3 of FIGS. 2 to 4 respectively have the same references but with the suffix a), the suspension engine pylon 3a comprises a lateral face 12a directed toward the root 9 and a lateral face 13a directed toward the distal end 10 which are respectively concave and convex.

In the example depicted, said lateral faces 12a and 13a are respectively concave and convex over the entire height of the engine pylon, so that the whole of the trailing edge 11a of the engine pylon 3a is shifted toward the root 9, with respect to the vertical mid-plane M-M.

Of course, as will be understood by what follows, just that part of the trailing edge 11a that corresponds to the lower part 14aI of the rear 14a of the engine pylon 3a and which is swept by the hot stream 6 could, according to the invention, be shifted toward the root 9.

Such at least partial shift of the trailing edge 11a generates a local overpressure symbolized by the + in FIG. 6) on the side of the lateral face 12a directed toward the root 9 and a local depression (symbolized by the − in FIG. 6) on the side of the lateral face 13a directed toward the distal end 10. This local overpressure and this local depression make it possible to correct the lift in the vicinity of the engine pylon 3a, which lift is disturbed by the presence of this engine pylon.

Thus, by virtue of the present invention and as shown by curve C2 in FIG. 5, the variation in lift P as a function of the span E of the wing near the engine pylon 3a of the invention is smoothed and becomes optimal.

As shown by FIG. 9, the concave lateral face 12a of FIG. 6 may be replaced by a convex lateral face 12'a (shown in solid line in FIG. 9), the convex nature of which is less pronounced than that of the lateral face 13a directed toward the distal end 10.

Furthermore, the concave lateral face 12a directed toward the root 9 (FIG. 6) may equally well be replaced by a lateral face 12"a that is substantially planar (illustrated in chain line in FIG. 9).

Figure 10:
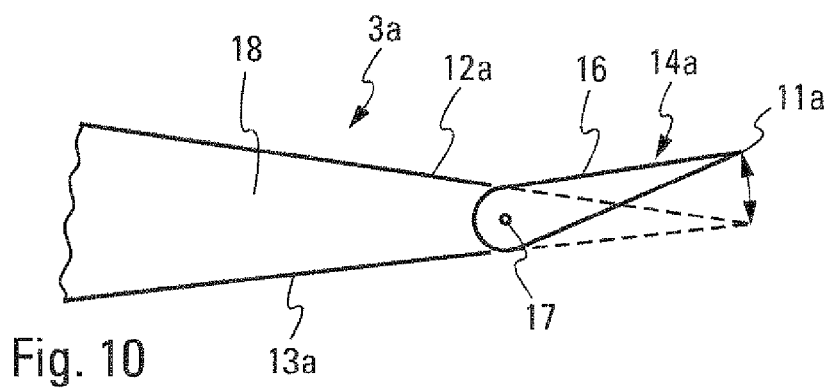
FIG. 10 illustrates another alternative form of embodiment of the suspension engine pylon according to the present invention.

Furthermore, as an alternative, as illustrated by FIG. 10, the rear lower part 14a of the engine pylon 3a may consist of a trailing edge flap 16 able to move about an axis of rotation 17.

The mobile flap 16 may thus reversibly occupy at least one of the following two positions:

an shifted position in which the trailing edge of the lower part 14aI of the rear 14a is shifted at least partially toward the root 9. The lateral face 12a directed toward the root 9 is then at least approximately concave and the one directed toward the distal end 10 is then at least approximately convex; and an aligned position in which the mobile flap 16 is aligned with the fixed part 18 of the engine pylon 3a.

The invention claimed is:

1. A engine pylon for suspending a turbo engine from a wing of an aircraft, said turbo engine having a vertical mid-plane passing through its longitudinal axis, said engine pylon comprising two lateral faces, of which one of the lateral faces is directed toward the root of said wing and the other of the lateral faces is directed toward a distal end of said wing, said lateral faces converging to form a trailing edge at a rear of said engine pylon, and a lower part of said rear of the engine pylon supporting and directly connected to a hot stream nozzle of said turbo engine such that said lower part of the rear of the engine pylon is swept by a cold stream of this turbo engine, wherein at least said lower part of the rear of the engine pylon is curved toward the root of said wing so that at least said trailing edge part of said lower part is shifted toward said root with respect to said vertical mid-plane.

2. The engine pylon as claimed in claim 1, wherein all of the rear of the engine pylon is curved toward said root so that all of said trailing edge of said engine pylon is shifted toward said root.

3. The engine pylon as claimed in claim 1, wherein the rear of the engine pylon is entirely fixed.

4. The engine pylon as claimed in claim 1, wherein at least said lower part of the rear of said engine pylon comprise a mobile trailing edge flap configured to reversibly occupy at least one of the following two positions:

a shifted position in which said trailing edge of said lower part is shifted at least partially toward said root; and an aligned position in which said mobile flap is aligned with the fixed part of said engine pylon.

5. The engine pylon as claimed in claim 1, wherein, at least in a region of the lower part of the rear of the engine pylon, said lateral face directed toward said root is concave and said lateral face directed toward said distal end is convex.

6. The engine pylon as claimed in claim 1, wherein, at least in a region of the lower part of the rear of the engine pylon, said lateral face directed toward said root is at least substantially planar and said lateral face directed toward said distal end is convex.

7. The engine pylon as claimed in claim 1, wherein said lateral faces are convex, the convex nature of said lateral face directed toward said distal end being more pronounced than the convex nature of said lateral face directed toward said root.

* * * * *